United States Patent [19]

Levanon et al.

[11] Patent Number: 5,896,412
[45] Date of Patent: Apr. 20, 1999

[54] WIRELESS COMMUNICATION SYSTEM

[75] Inventors: Yohanan Levanon, Herzliya; Benjamin Peled, Ramat Hasharon, both of Israel

[73] Assignee: Crossbow, Ltd., Herzliya, Israel

[21] Appl. No.: 08/278,885

[22] Filed: Jul. 22, 1994

[51] Int. Cl.[6] .................. H04B 15/00; H04K 1/00; H04L 27/30
[52] U.S. Cl. .............................. 375/202; 370/222
[58] Field of Search ........................... 375/200–210, 375/219, 222, 259; 455/63, 509, 510; 370/221, 222, 258

[56] References Cited

U.S. PATENT DOCUMENTS

| | | | |
|---|---|---|---|
| 4,716,573 | 12/1987 | Bergstrom et al. | 375/202 |
| 4,761,796 | 8/1988 | Dunn et al. | 375/200 |
| 4,933,954 | 6/1990 | Petry | 375/200 |
| 4,949,395 | 8/1990 | Rydbeck | 455/33 |
| 5,079,768 | 1/1992 | Flammer | 375/202 |
| 5,287,384 | 2/1994 | Avery et al. | 375/200 |
| 5,301,188 | 4/1994 | Kotzin et al. | 370/50 |
| 5,377,221 | 12/1994 | Monday et al. | 375/202 |
| 5,724,666 | 12/1993 | Dowdell et al. | 375/1 |

*Primary Examiner*—Chi H. Pham
*Assistant Examiner*—Bryan Webster
*Attorney, Agent, or Firm*—Woodcock Washburn Kurtz Mackiewicz & Norris LLP

[57] ABSTRACT

A method of wireless communication among a plurality of stations in which each station communicates with all of the other stations over a cycle time divided into a plurality of communication sectors during each of which one of the stations transmits, including the step of changing the frequency of the transmission in accordance with a predetermined protocol, only at the end of a sector in which one of the stations transmits. Preferably, the frequency of transmission is reset to a given frequency in accordance with the protocol when none of the stations transmit over a predetermined period.

13 Claims, 7 Drawing Sheets

WIRELESS COMMUNICATION SYSTEM

The present invention relates to wireless communication and more particularly to wireless communication among a plurality of remote stations in which each station communicates with all of the other stations.

BACKGROUND OF THE INVENTION

The problem of communication between a plurality of mobile stations which allows for each of the stations to communicate with all of the other stations is not new.

Such communication is especially useful in emergency situations where a group of police or firemen must be able to communicate simultaneously with all other members of the group, by voice, in order to coordinate their activities.

U. S. Pat. No. 5,274,666 describes a daisy-chain system in which each of the units in the chain receives audio signals from one other unit, attenuates the signals, adds additional audio signals, corresponding to speech by the user of the unit, to the attenuated signals and then broadcasts the composite signal to one other unit. This transmission from unit to unit continues until the chain is closed. Attenuation of the signals before rebroadcast is added to avoid looping and unwanted feedback. However, such attenuation results in variations in the audio volume depending on the position in the loop of the speaker and listener and/or an echo in the system, depending on the number of stations and the amount of attenuation. Both of these effects are undesirable and, in the extreme, can cause some of the communications to be unintelligible.

Transmission around the loop is in a frequency hopping spread spectrum mode where the receive frequency and transmit frequency of each of the units is different and where the frequencies are changed (hopped) periodically based on a pseudo-random function known to all the stations.

It is a characteristic of such a system that each of the stations is always active and transmits during a portion of each "loop" even if the particular unit has nothing to add to the conversation. Furthermore, the units must be continuously synchronized to the time and frequency of the hops as well as to the receive and transmit time of the unit, for example, by a very accurate clock in each unit.

This combination of characteristics leads to a number of inherent problems with such a system. First, noise at any of the hopping frequencies will transmit itself as noise over all of the conversations. Second, receiver or transmitter noise in any of the units causes noise to be generated in the system, even if the particular unit has nothing to say. Third, while noise considerations limit the number of units in a system, this number is still much larger than can be easily understood. In general, every listener is a potential speaker and all the speakers, could, at least in principle, speak at the same time, making speech unintelligible. There is thus no provision for listen only units which cannot speak. Finally the operation of this system results in a relatively heavy, expensive system with high power requirements and a short operating time between charges.

SUMMARY OF THE INVENTION

It is an object of the invention to provide a communication system among a group of stations having improved characteristics.

The system of the present invention is based on a relatively constant "cycle" time which is divided into a number of time sectors "n". The system preferably operates in a frequency hopping spread spectrum mode in which the starting frequency is reset to a given frequency $f_o$ during a "quiescent" period which starts whenever there is no new audio based communication during at least one cycle plus one sector.

During a quiescent period each of the stations goes into a power saving "sleep" mode in which it listens for a broadcast by one of the other stations at frequency $f_o$. A station which starts to broadcast during a quiescent period first digitizes the audio signals generated during one cycle and broadcasts the digital signals so generated at frequency $f_o$ during one of the time sectors.

It is this broadcast which starts the sequence of frequency hopping and sector division for all of the stations, which sequence continues until the next quiescent period. Preferably, the frequency hops whenever there is a transmission by one of the units. The frequency is preferably constant during the sector and changes at the end of the sector in which transmission has occurred. This reduces the complexity of the system while preserving the noise and interference reduction characteristics of the frequency hopping technique and frequency band occupation limitations mandated by FCC regulation §15.247. If desired, however, the frequency hopping can be slower than the sector change frequency with added logical complexity.

A second station which wishes to transmit during a non-quiescent period, picks a sector which was not used during the previous cycle, determines the time of the chosen sector in conjunction with the sector time sequence established by a previous transmission of another station, digitizes voice signals during one cycle and broadcasts the digitized data during its chosen sector. It then preferably continues to broadcast during this sector for subsequent cycles until it stops broadcasting for at least one cycle, at which time the sector is freed for other users.

In a preferred system, the cycle time is 2 milliseconds and is divided into 4 sectors. Voice generated during a cycle is digitized into 32 bits which is broadcast during one sector of 500 microseconds, at a rate of 16 kilobits/second, leaving about 180 microseconds per sector for frequency stabilization and switching and processing tasks required by the system. Of course other cycle times, digitizing rates, sector widths and data rates may be used depending on the circumstances of the particular application. The preferred system provides for practically collision free communication between up to 18 stations, depending on the average ratio of talk time to listen time which is characteristic of the particular application. However, since speech of more than four people at the same time is unintelligible, preferably only four sectors are used.

It should be noted that, unlike prior art systems, which employ either a master or central station through which all communication passes or which employ a daisy chain approach in which each message is transmitted many times before it reaches the last of the listening stations, the system of the present invention relies on direct communication between each transmitting station and each of the receiving stations, without any intermediaries, be they a master or another station in the group.

BRIEF DESCRIPTION OF THE DRAWINGS

The present invention will be more clearly understood from the following detailed description of a preferred, illustrative embodiment of the invention, taken in conjunction with the attached drawings, in which.

DETAILED DESCRIPTION OF THE PREFERRED EMBODIMENTS

The operation of the system will be described using FIG. 1, by successively assuming more complicated operation of the system and describing the operation of both a transmitting and a receiving station for each situation.

Figure 1:
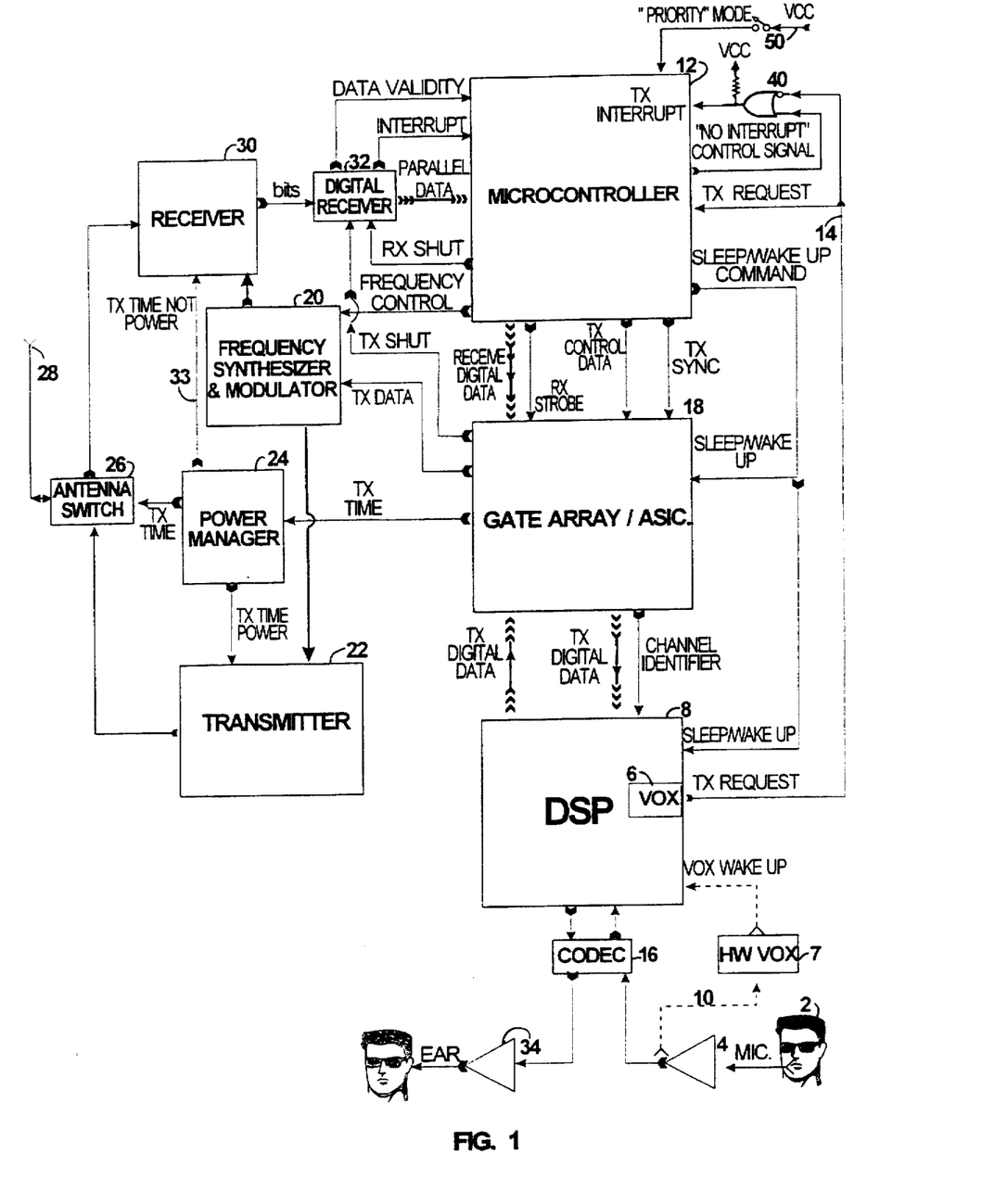
FIG. 1 is a general system block diagram of one mobile station in accordance with a preferred embodiment of the invention.

Referring to FIG. 1, which shows a block diagram of one station of a communication system, assume that the communication system is in the quiescent state, i.e., that none of the stations has been broadcasting for at least one cycle and one sector. A user 2 speaks into microphone 4. A speech signal is transmitted to a system VOX (Voice Operated Transmitter) 6 over a line 10. The system VOX is implemented in a DSP (Digital Signal Processor) 8 and also includes an additional hardware VOX level recognizer (which can be considered as part of VOX 6) 7 which operates only during the quiescent state.

When microphone audio signals are detected by the additional hardware, the hardware "wakes up" only the DSP which analyses the signals. If the signals are not characteristic of voice, the DSP goes back to sleep. If the signal is recognized as a speech signal, VOX 6 generates a Tx (transmit) request signal which is transmitted to a microcontroller 12 and a Gate Array/ASIC (Application Specific Integrated Circuit) 18 over a line 14. Microcontroller 12 receives the Tx request signal, which wakes it up and generates a series of signals to prepare the station to transmit. The Tx signal also wakes up the Gate Array.

The speech signal is digitized by a CODEC (Coder-Decoder) 16 and the digitized signals are transmitted to DSP 8 which transmits them as Tx digital data to gate array 18.

Sync signals and Tx control signals used to synchronize transmission of data by gate array 18 are also generated by microcontroller 12 in response to the Tx request. Gate Array 18 transmits the Tx data to a frequency synthesizer and modulator 20, which modulates the Tx data in accordance with a frequency control signal from microcontroller 12 and passes the modulated signal on to a transmitter 22. In the present case, where the system is in the quiescent state, the transmission frequency is $f_o$, the first frequency hopping signal.

In response to the Tx sync signal, gate array 18 also sends a Tx time signal, which indicates when the signal should be broadcast, to a power manager 24, which in turn sends a Tx time/power signal to the transmitter. Power manager 24 also sends a Tx transmit signal to an antenna switch 26 which switches an antenna 28 to receive signals from transmitter 22.

During the Tx time, which corresponds to somewhat less than one sector of the cycle of the system, antenna 28 broadcasts the digitized, modulated speech data to all the other stations. At the end of the Tx time (i.e., at the end of the sector in which the data is transmitted by the station), the antenna is switched to a receive mode and antenna 28 is connected to a receiver 30. At this time a new frequency control signal is generated by microcontroller 12 and sent to frequency synthesizer 20. This new frequency control signal changes the frequency for modulation and for demodulation by the receiver to $f_1$, the second frequency in the hopping sequence. During the transmission by the station and during the short time after the transmission required for changing frequencies, a Tx shut signal, generated by the gate array, shuts down the digital receiver to avoid reception of erroneous signals.

After the frequency has changed, the power manager also sends an enable signal over a line 33 to the receiver which activates the receiver. At the end of each transmission by any of the units in the system (i.e., after every transmission made by the station or received by it) the frequency of the receiver is successively changed to $f_2, f_3, \ldots$ The system continues to listen until the end of the cycle at which time the sector at which the first transmission of the station took place reoccurs. During this period additional speech is digitized by DSP 8 and transferred to gate array 18 in preparation for the next Tx period which will take place in the same sector in the cycle as did the first transmission. This transmission will take place at a frequency between $f_1$ and $f_n$, the (n+1)th frequency in the hopping sequence (where n is the number of sectors in the cycle), depending on the number of transmissions (and frequency changes) during the cycle.

Each station has priority over its sector and keeps such priority for a short period before and after the start of the sector on the next cycle. In the event that another station intrudes (or is close to intruding) on this sector, the station delays its transmission until the next available sector.

FIG. 1 will now be used to illustrate operation at another station which receives the signal which was broadcast at frequency $f_o$ after a quiescent period, by the first station. In the receiving station, antenna switch 26 is in the receive mode and the received signal is passed to receiver 30. Since the receiving station is not broadcasting and is awaiting the start of a cycle, the receiver frequency is $f_o$, the same as that of the signal transmitted by the first station. The received signal is demodulated by receiver 30 and the digital audio signal thus generated is passed to a digital receiver 32 which passes the digital data in parallel form to microcontroller 12.

Digital receiver 32 also generates a data validity signal which it sends to microcontroller 12. This signal gives the results of a check on the consistency of measurements on each data pulse as is well known in the art. The microcontroller validates the received data, by checking for errors in it such as parity, pulse start and stop times, etc. If the received data is valid, the data is used. If not the data is ignored. Usually a more stringent acceptance criteria is used on the first data byte in a sector then in subsequent bytes. In this way, poorly transmitted data and noise in one of the sectors are kept out of the system and do not contaminate the data in the other sectors as would be the case in the '666 patent described above.

Digital receiver 32 also generates an interrupt signal which starts a cycle clock in the microcontroller on receipt of the signal. On each receipt of this cycle clock, the microcontroller starts a new cycle and uses its internal clock to divide the cycle into sectors. At the end of each transmission received or sent by the station, the frequency is changed in accordance with a frequency hopping protocol which is characteristic of the particular group of stations. An Rx shut signal is sent to the digital receiver by the microprocessor during the frequency change caused by a reception in a sector to avoid spurious signals being received by the receiver.

It should be noted prefer the receipt of a signal preferably resets the timing of the sector to the timing of the received signal thereby assuring that if a transmission by the receiving station is desired, it will be in correct time synchronization. In the preferred embodiment of the present invention, none of the stations acts as a "master" and none of the systems requires a very accurate clock. The timing of both the transmission slots and the frequency changes in the systems is self adjusting without the need for either a master, a very accurate clock or a central station.

Microcontroller 12 receives the data from digital receiver 32 and passes it to gate array 18, together with a strobe, which enables the gate array to transmit the data to DSP 8, together with a channel identifier signal. DSP 8 generates a digital audio signal for each channel using data received over a number of cycles and combines the digital audio data in all the channels which it passes to CODEC 16. The CODEC converts the combined digital audio data to (analog) audio which is heard by the user via an earphone 34.

In practice it has been found useful to provide n separate channels in the DSP and gate array, one for each sector. One channel is used for both receive and transmit (T/R) and the other channels are receive only channels. The T/R channel is reserved for transmission by the station and is used for receive only if all the other channels are in use.

In addition to starting the cycle and sector timing, receipt of the broadcast also results in the generation of a wake up command, after a quiescent period, to prepare the gate array and DSP to receive the incoming information.

In a preferred embodiment of the invention, a priority mode is provided to one or a limited number of stations. These stations are equipped with a priority mode switch 50 which is operative to send a voltage to microcontroller 12. On receipt of this voltage, Microcontroller 12 instructs the station to transmit its signal at a time slightly after the beginning of a sector. In this case, a unit which would have transmitted during the next sector will receive an indication that a transmission is taking place "too close" in time to its sector and as described above, it will not transmit and wait for the next empty sector. However, the priority station will transmit an "idle pattern" (one which decodes to no voice signal) in all of the other sectors, again somewhat later than the normal transmission time. In this way all the stations other than the priority one will stop transmitting. No new station will be able to start transmission since all of the sectors are occupied.

Turning now to the situation in which one of the receiving stations wishes to transmit while the system is active, i.e., while it is not in the quiescent mode. In this case, when the Tx request is received by the microcontroller, it assigns an available sector which was not used in the previous cycle to transmit the data being generated by DSP 8 from the audio being produced. The transmission mode of operation in this situation is the same as that described earlier with respect to the first transmission after quiescent, except that the time of transmission is no longer arbitrary, but is set within of the free sector chosen and the frequency is set within the hopping sequence associated with the group of stations based on the total number of transmissions and receptions experienced by the station since the last quiescent period.

In a preferred embodiment of the invention, the sector used for transmission is determined in the following way.

Figure 3A:
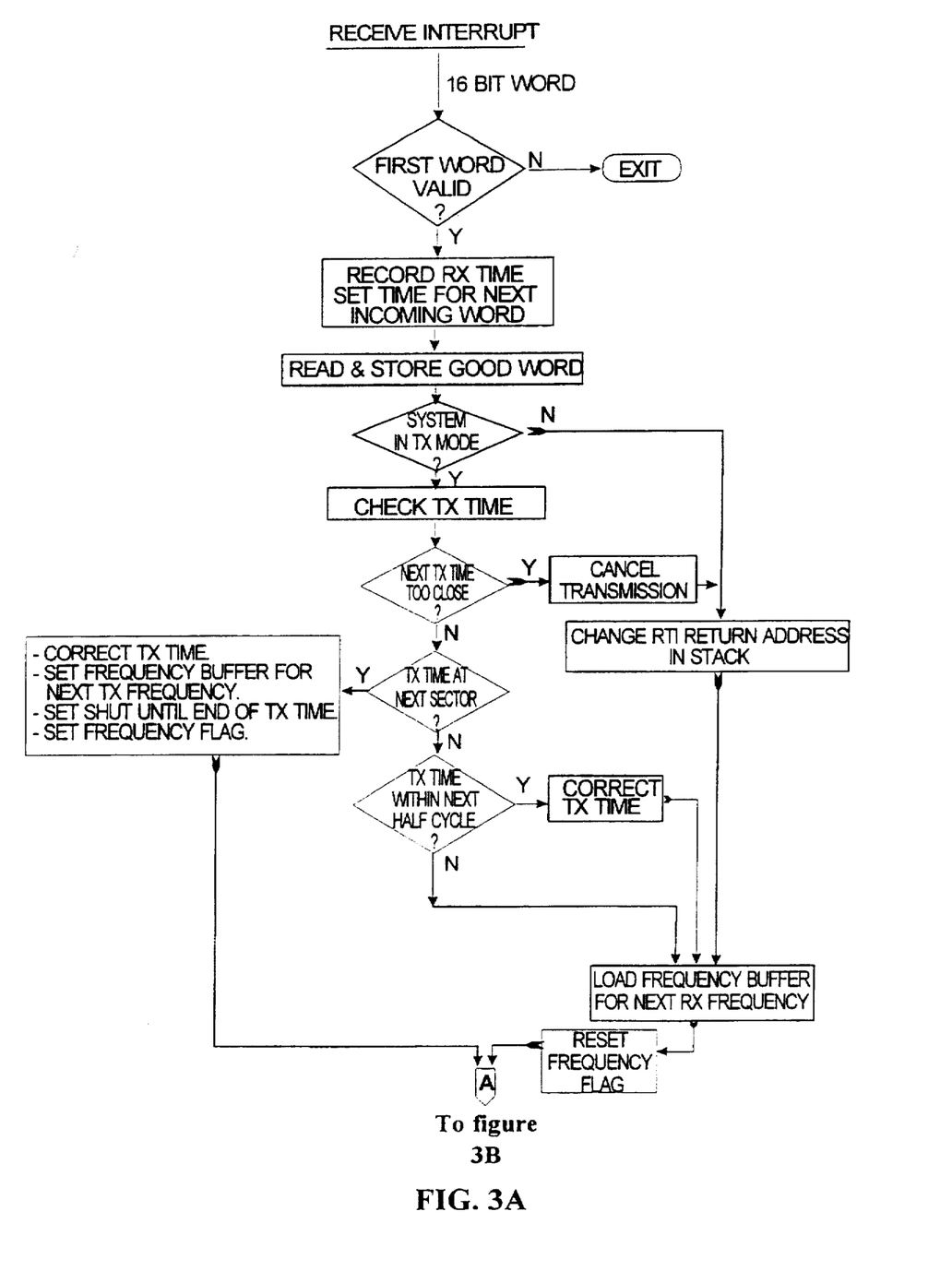
FIGS. 3A and 3B constitute a receive interrupt logic diagram which schematically illustrates the receive interrupt sequence according to a preferred embodiment of the invention.
Figure 3B:
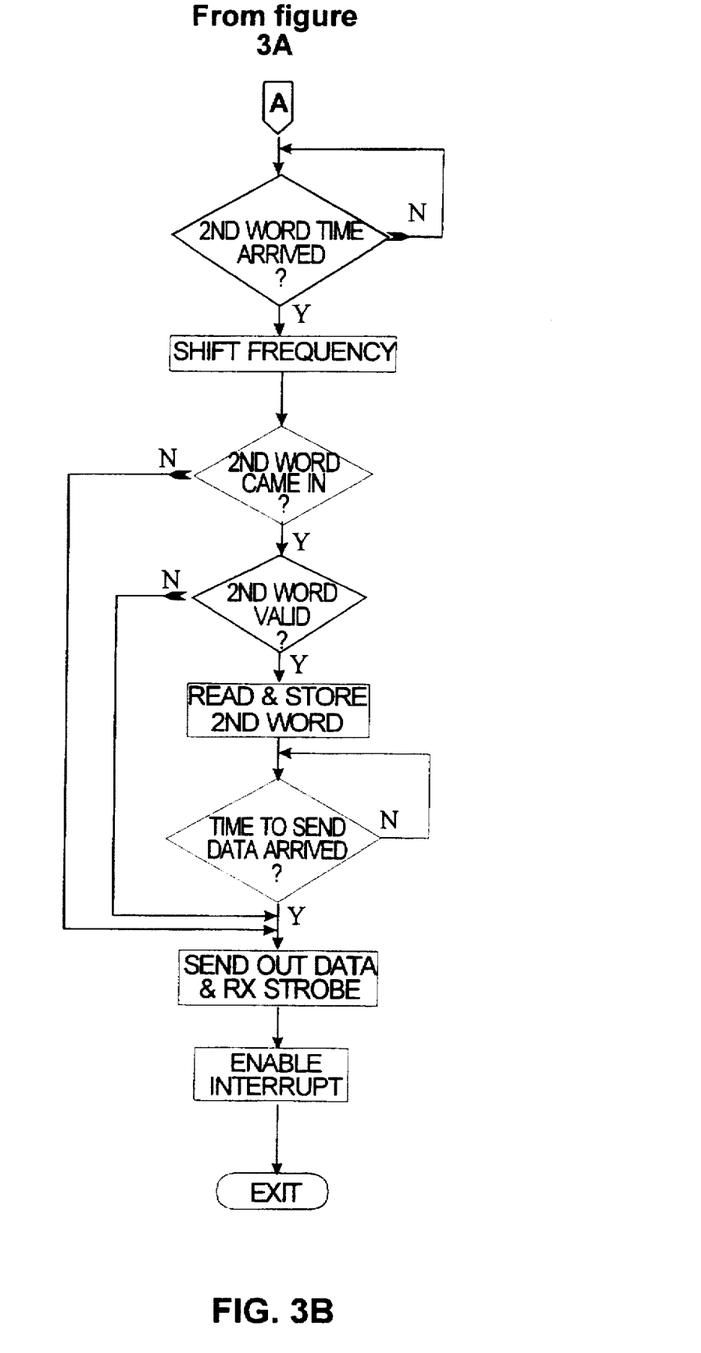

Every time a transmission is received, the system enters a receive interrupt routine shown in FIGS. 3A and 3B. At the end of the receive interrupt routine, a vacant sector is searched for. When one is found, the Tx request line is polled. If a Tx request is set, the previously found vacant sector is assigned for transmission during the next cycle. If the Tx request is not set, the routine searches for the next vacant cycle and repeats the search for TX request.

Whenever at least one vacant sector exists, the system has time to complete the receive interrupt routine and poll for the Tx request. If all the sectors are busy with receive interrupts, there is no search for a Tx request since there is no sector available for transmission.

This procedure also assures a quasi-statistical search for free sectors and reduces the collision probability whenever more than one sector is available and more than one station begins transmission in a given cycle of 2 milliseconds.

During the quiescent period, the microcontroller is in a low power sleep mode. Before going to sleep, the "no interrupt" line of Tx interrupt circuit 40 is set low such that a Tx request signal can cause an interrupt (Tx interrupt) which wakes up the system.

A station which transmitted during a particular sector in a given cycle is given priority over the system, one cycle later for a number of microseconds, preferably about ±20 microseconds. This assures, that even though the clocks of the various stations are not synchronized, the station will continue to broadcast over the same sector.

A particular transmitting station "A" synchronizes its transmission time with the last previous transmitting station "B" if the previous transmission was less than one-half cycle earlier. If "B" transmitted more than one-half cycle earlier it will synchronize itself on "A." This avoids a circular situation which would result if every station synchronized on the previous transmission, no matter where in the cycle it occurred. In the preferred synchronization scheme the sectors times may undergo continuous shifting of a few microseconds and are understood to be virtual time slots depending on the previous events, rather than on an accurate clock. Furthermore, the sector time will depend on the average distance between the stations, since the transmission delay must be added to the actual transmission time in determining the sector lengths.

While it might be expected that it would be best to make the required shifts in timing in full with each sector, this may result in added noise and, if the sectors shrink too much, in data loss. In a preferred embodiment of the invention, a shift takes place in each sector, however, it is limited to a fixed fraction, "q," of the required total shift. It has been found that a value of q of about 8 gives good results. This value of q will reduce a sector time length error of 30 microseconds to 1 microsecond in 14 milliseconds (7 cycles) which is fast enough to be unnoticeable yet slow enough to avoid causing noise or other problems in the system. Other values, such as q between 4 and 32 can also be advantageously be used. Optionally, q may be set at 1 (full correction) especially if the variation in distance between the stations is small.

It might be thought that the capacity of the number of stations would be limited to n the number of sectors in each cycle. This, however, is not the case since the average station broadcasts only a small percentage of the time. In any event, the number of speakers should be limited, and is automatically limited in the present embodiment, since the human brain is limited in the number of simultaneous conversations it can understand.

In order to reduce even further the possibility of collisions, where more than one sector is available, the choice of sector is decided on a random basis. This random choice further reduces the chances that two stations which come on line during the same cycle will choose the same available sector. Furthermore, if all sectors are "busy" and a station wishes to transmit, it must wait for one sector to become available. However, to avoid the possibility that more than one station is waiting and that both stations will clash in trying to use the same sector, each station which wishes to broadcast in such a situation will wait a random number of cycles before it transmits, further reducing the probability of clashes.

If during one cycle and one sector no transmission takes place, all of the stations return to the quiescent state and a sleep signal is generated by the microcontroller and transmitted to the DSP and Gate array which are switch to a low power waiting mode and $f_o$, the start of the hopping sequence.

One potential problem with the system of the invention is EMI interference between a transmitted pulse and the low power microphone audio signal. Conventional methods of "perfect" shielding are difficult and costly to implement.

In a preferred embodiment of the invention the need for such shielding is reduced and such interference is substantially eliminated by passing the audio signal through a recursive filter which correlates each data sample to the sample at the same time in the previous cycle and subtracts the filtered signal from the current audio signal. Since each transmitter broadcasts during the same sector in each cycle, any interference to its audio signal generated by its own transmission will occur during the same part of the cycle. This interference signal will closely correlate from cycle to cycle and can thus be removed from the signal by this method. Since the speech itself is not so correlated, it will be only minimally affected by the filtering operation.

The correlation and subtraction process is most effectively carried out in the DSP of a transmitting station on its own audio signal prior to processing the audio.

These methods continue to reduce the interference so long as the same station continues to transmit over the same sector. Recursion (multiplicative) factors of (1/512) to (1/256) (corresponding to ½–1 second of averaging time) for the recursive filter has been shown to give good reduction of transmitter EMI without substantial deterioration of the audio signal.

While the system, can and, has been implemented with standard components and circuitry, a dedicated gate array rather than a programmable one would normally be used in manufacturing. A microcontroller which is useful in the practice of the invention is, for example, the Motorola MC68HC11D3. The frequency synthesizer of FIG. 1 is preferably implemented with a Phillips UMA 1016XT.

Figure 2A:
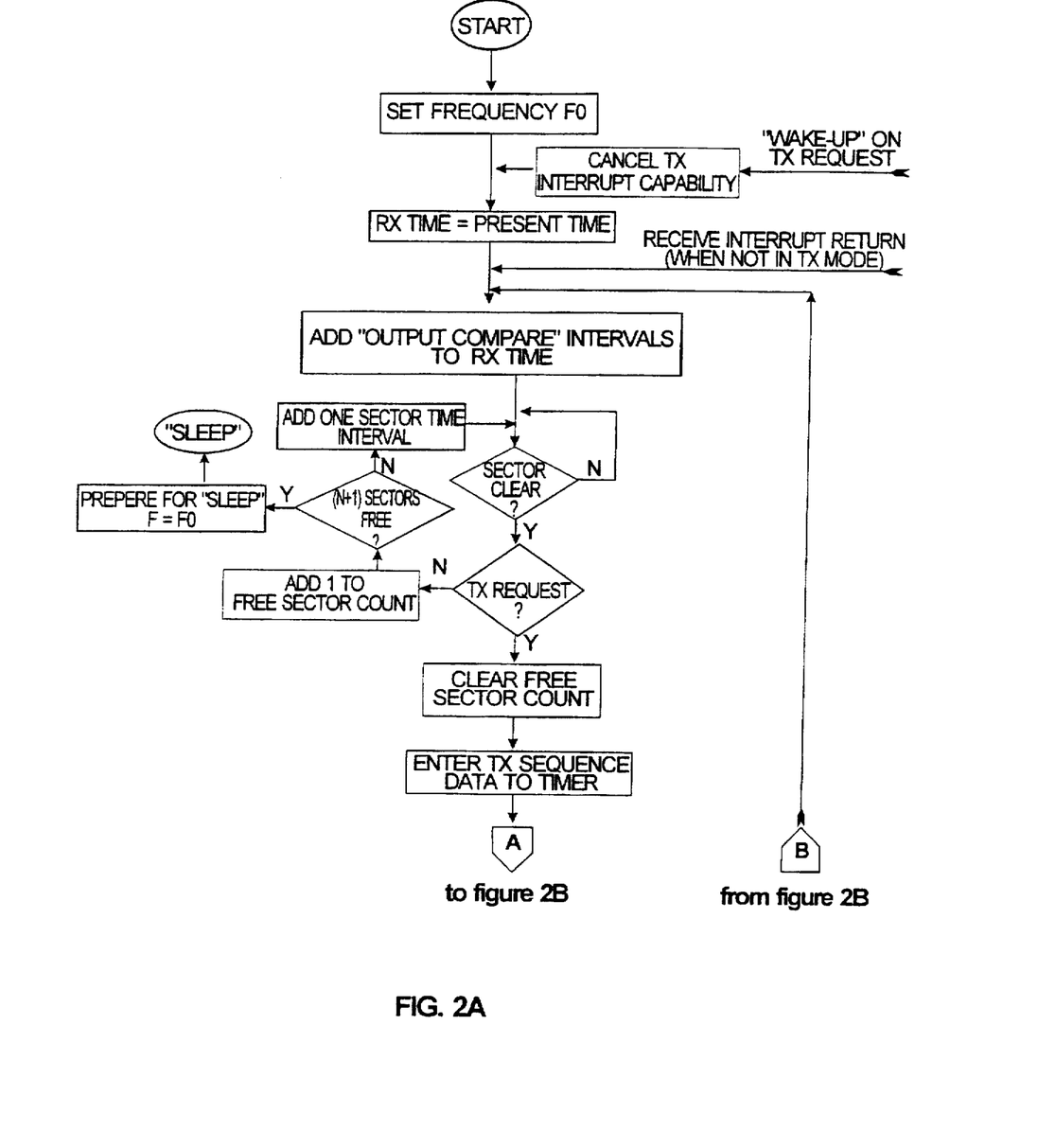
FIGS. 2A, 2B and 2C constitute a main sequence logic diagram which schematically illustrates the general operation of a system according to a preferred embodiment of the invention.
Figure 2B:
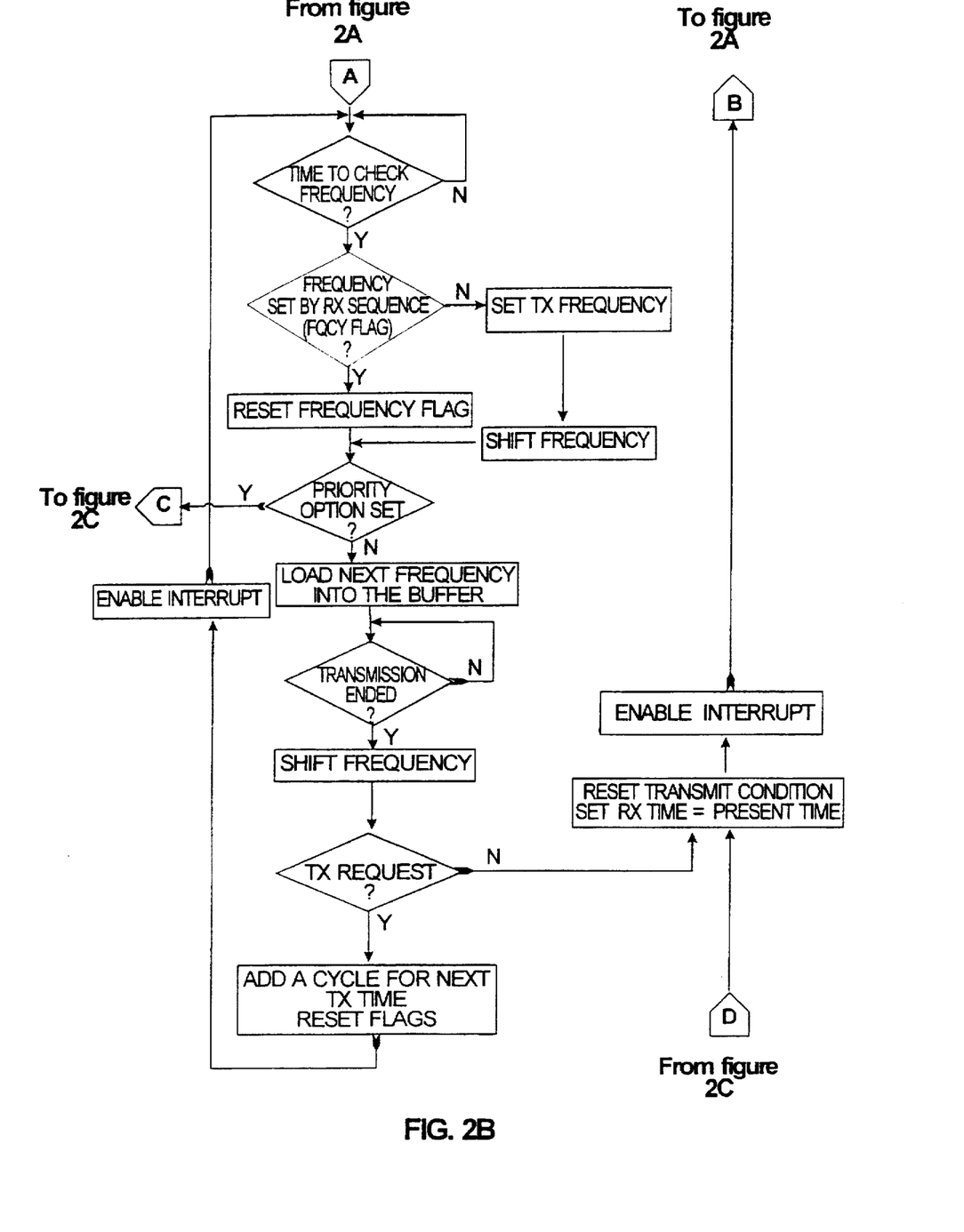
Figure 2C:
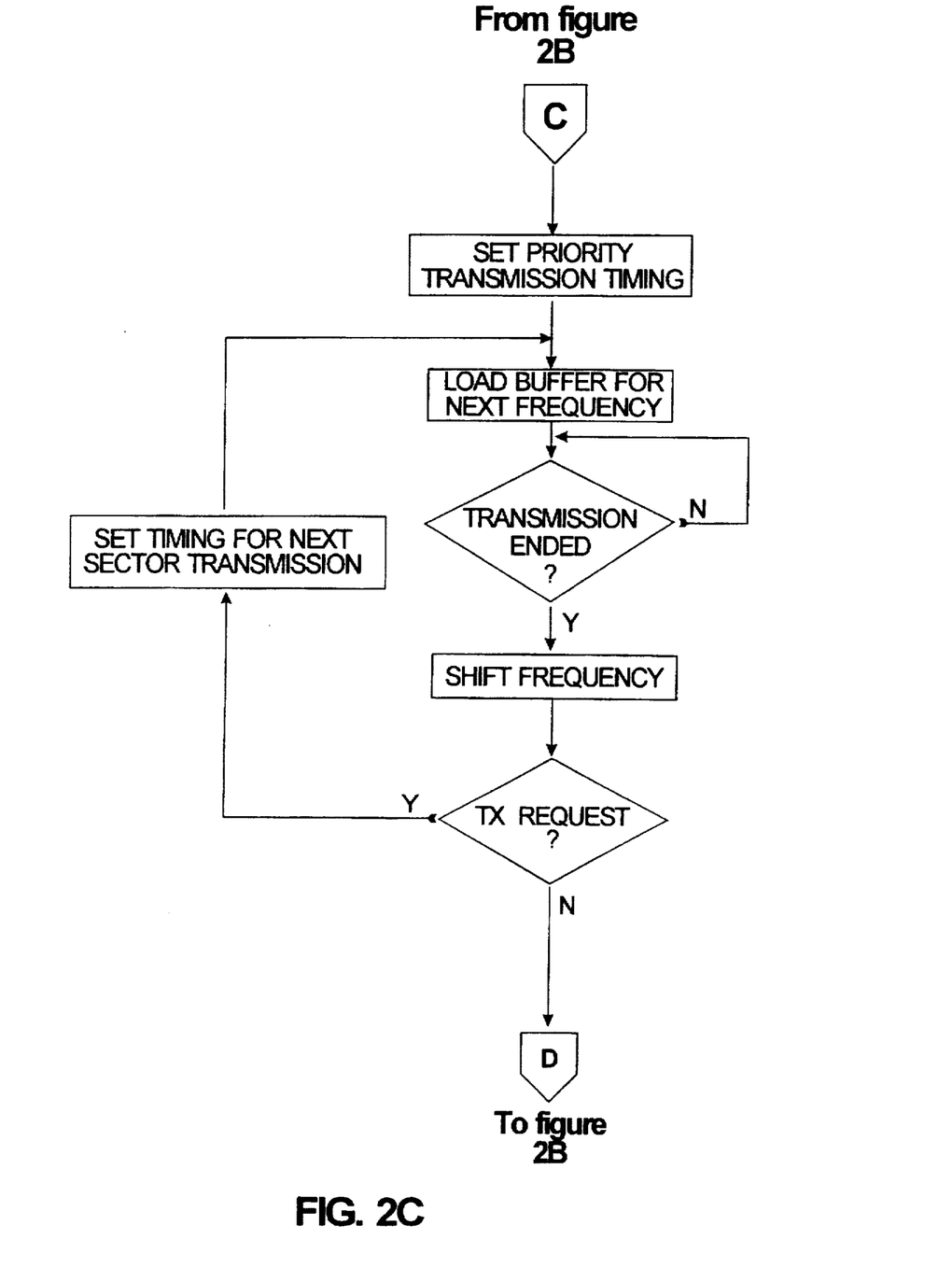
Figure 4:
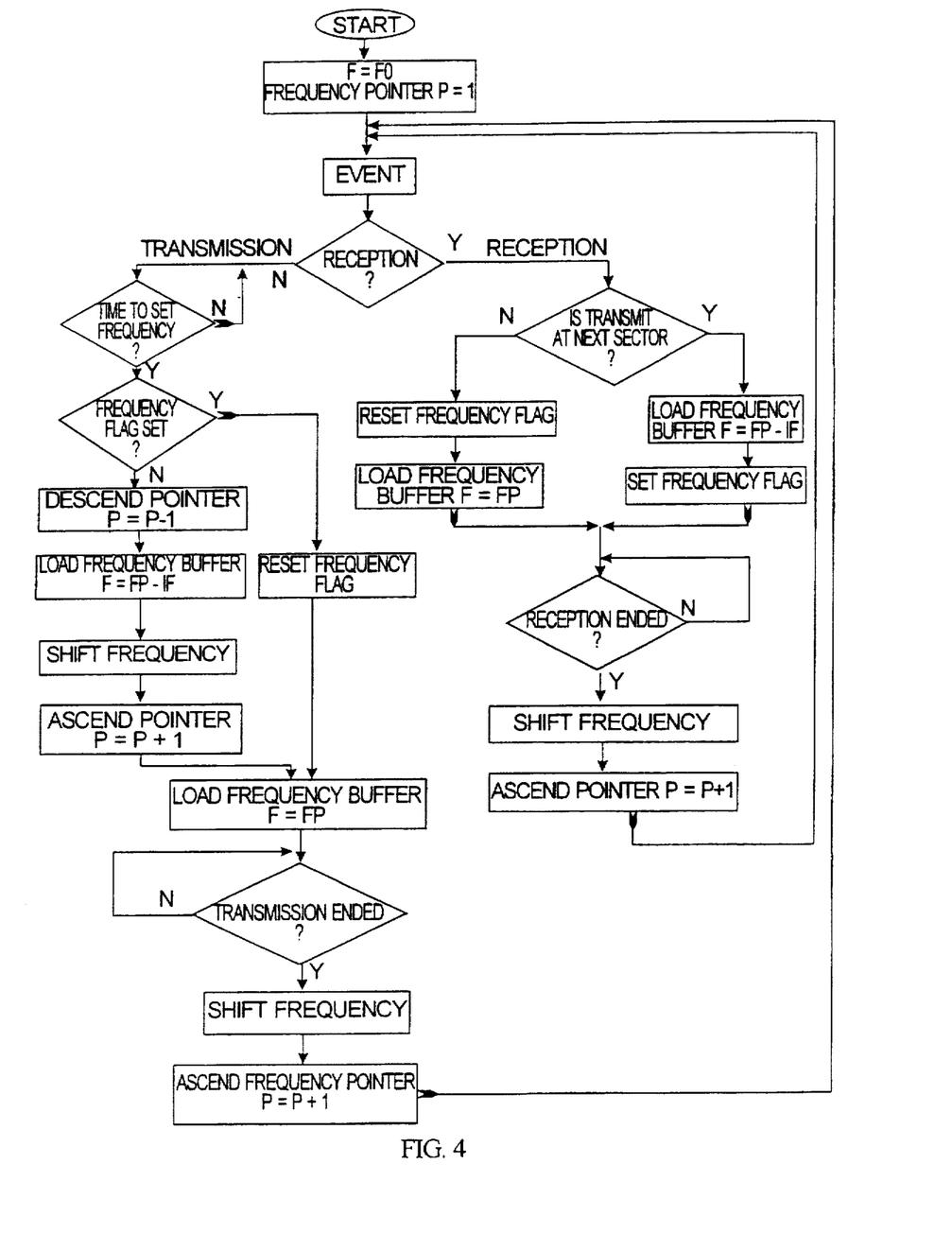
FIG. 4 is a frequency management logic diagram which schematically illustrates the logic of the frequency hopping performed in a system according to a preferred embodiment of the invention.

FIGS. 2A, 2B and 2C constitute a main sequence logic diagram of a system such as that shown in FIG. 1 in accordance with a preferred embodiment of the invention, wherein FIG. 2C is the sequence for the priority option described above. FIGS. 3A and 3B constitute a receive interrupt block diagram for a preferred embodiment of the system. FIG. 4 constitutes a frequency management logic diagram which illustrates the logic used by the system in making the frequency changes required by the frequency hopping of the preferred embodiment of the invention.

As can be seen in FIGS. 2B, 3A and 4, a frequency flag is used, in a preferred embodiment of the invention, in the decision as to whether the frequency of the frequency synthesizer should be shifted by an amount equal to the IF frequency when in the main program.

The reason why such a shift is necessary is based on the fact that the synthesizer frequency is different depending on whether the system is receiving or transmitting. When the system is receiving, the receiver oscillator must be tuned to $(f_n+IF)$ such that the output is at the IF frequency, while for transmission, the oscillator must be tuned to $f_n$.

After each transmission or reception at a frequency based on the hopping frequency $f_n$ the oscillator is tuned to $(f_{n+1}+IF)$ in anticipation of receiving a signal during the next sector. When the station is scheduled to transmit in a given sector, the frequency is changed to $f_{n+1}$ about one-half sector time before the transmission is to begin.

If however, the station is receiving a signal during the sector immediately prior to the scheduled transmission sector, the change in frequency (removing the IF portion) must take place later, and the controller cannot exit the reception interrupt program in time to change the transmission frequency by the main program as would be the case when no signal is being received.

In this case, when the received interrupt program detects that a transmission is scheduled during the next sector, it assures that the frequency will be set initially to $f_{n+1}$ and not to the normal setting of $(f_{n+1}+IF)$. While doing this, the program sets the "frequency flag." When the system returns to the main program (after performing the received interrupt sequence) prior to transmission, the frequency flag is detected and the frequency is not shifted by IF, since it was originally set correctly for transmission.

These logic diagrams are presented for illustrative purposes and full software for the system can be directly generated by a programmer of ordinary skill based on these logic diagrams.

Although various embodiments, forms and modifications have been shown, described and illustrated above in some detail in accordance with the invention, it will be understood that the descriptions and illustrations are by way of example, and that the invention is not limited thereto but encompasses all variations, combinations and alternatives falling within the scope of the claims which follow:

We claim:

1. A method of wireless communication among a plurality of stations comprising:

causing each of said plurality of stations to directly receive transmission from all other stations on a single common frequency of transmission and in which the frequency of transmission changes in accordance with a predetermined protocol;

determining if one of the stations has transmitted during a given sector;

determining the starting time of a sector based on the time of the last previous transmission prior to the sector; and changing the frequency of transmission in accordance with the protocol, only for a sector which follows a sector in which one of the stations transmits, wherein each station communicates with all of the other stations over a cycle time divided into a plurality of communication sectors during each of which one of the stations transmit;

wherein the frequency changes at the end of each sector in which a station transmits, in accordance with the protocol.

2. A method of wireless communication among a plurality of stations comprising:

causing each of said plurality of stations to directly receive transmission from all other stations on a single common frequency of transmission and in which the frequency of transmission changes in accordance with a predetermined protocol;

determining if one of the stations has transmitted during a given sector;

determining the starting time of a sector based on the time of the last previous transmission prior to the sector; and changing the frequency of transmission in accordance with the protocol, only for a sector which follows a sector in which one of the stations transmits, wherein each station communicates with all of the other stations over a cycle time divided into a plurality of communication sectors during each of which one of the stations transmit;

wherein the frequency changes at the end of each sector in which a station transmits, in accordance with the protocol.

3. A method of wireless communications among a plurality of stations in a spread-spectrum, frequency-hopping mode in which a transmission frequency is hopped or changed, comprising:

determining that none of the stations has transmitted during a predetermined period;

determining the starting time of a sector based on the last previous transmission prior to the sector; and resetting the hopping frequency to a given frequency in accordance with the protocol when none of the stations transmit over a predetermined period, wherein each station communications with all of the other stations over a cycle time divided into a plurality of communication sectors during each of which one of the stations transmit, and wherein the hopping frequency remains constant during a time in a particular cycle during which one of the station transmits.

4. A method of wireless communication among a plurality of stations, each station communicating with all of the other stations over a cycle time divided into a plurality of communication sectors, comprising:

noting the starting time of each transmission by any station; and determining the starting time of a sector based on the starting time of the previous transmission by any of the stations prior to the sector, wherein one station may communicate with all of the other stations during one of the plurality of communication sectors.

5. Communication apparatus for wireless communication among a plurality of stations, each said station comprising:

an antenna;

a transmitter which transmits signals to all of the other stations when it is connected to the antenna;

a receiver which receives signals from all of the other stations when it is connected to the antenna;

a switch which selectively connects one of said transmitter or receiver to the antenna in respective transmission and receiving modes of operation; and an oscillator which determines the frequency of the transmitter and receiver and which is set to a given frequency in accordance with the protocol when the station has neither received nor transmitted signals during a given period, wherein each station communicates with all of the other stations in a spread-spectrum, frequency hopping mode in accordance with a predetermined protocol over a cycle time divided into a plurality of communication sectors during each of which one of the stations may transmit, wherein the transmitter transmits during a sector whose starting time is based on the time of the previous transmission prior to the sector.

6. Apparatus according to claim 3 wherein the predetermined period is one cycle and one sector in length.

7. Apparatus according to claim 5 wherein the frequency changes only at the end of each detector in which the station either transmits or receives a signal or when the station has neither received nor transmitted signal during said given period, in accordance with the protocol.

8. Apparatus according to claim 5 wherein the transmitter transmits during a sector whose starting time is based on the time of the previous transmission prior to the sector.

9. Communication apparatus for wireless communication among a plurality of stations, each station comprising:

an antenna;

a transmitter which transmits signals to all of the other stations when it is connected to the antenna;

a receiver which receives signals from all of the other stations when it is connected to the antenna;

a switch which selectively connects one of said transmitter or receiver to the antenna in respective transmission and receiving modes of operation; and an oscillator which determines the frequency of the transmitter and receiver and which changes said frequency at the end of a sector in response to either transmission or receipt of signals during the sector, wherein each station communicates with all of the other stations in accordance with a spread-spectrum, frequency hopping mode in accordance with a predetermined protocol over a cycle time divided into a plurality of communication sectors during each of which one of the stations may transmit, wherein the transmitter transmits during a sector whose starting time is based on the time of the last previous transmission prior to the sector.

10. Apparatus according to claim 9 wherein the oscillator is operative to reserve the frequency to a given frequency in accordance with the protocol when the station neither receives nor transmits during a predetermined period.

11. Apparatus according to claim 10 wherein the predetermined period is at least one cycle and one sector in length.

12. Apparatus according to claim 11 wherein the predetermined period is one cycle and one sector in length.

13. Apparatus according to claim 5 wherein the predetermined length is at least one cycle and one sector in length.

* * * * *